J. E. PECK.
TROLLEY POLE AND BRAKE CONTROL.
APPLICATION FILED JAN. 12, 1912.
1,072,252.
Patented Sept. 2, 1913.
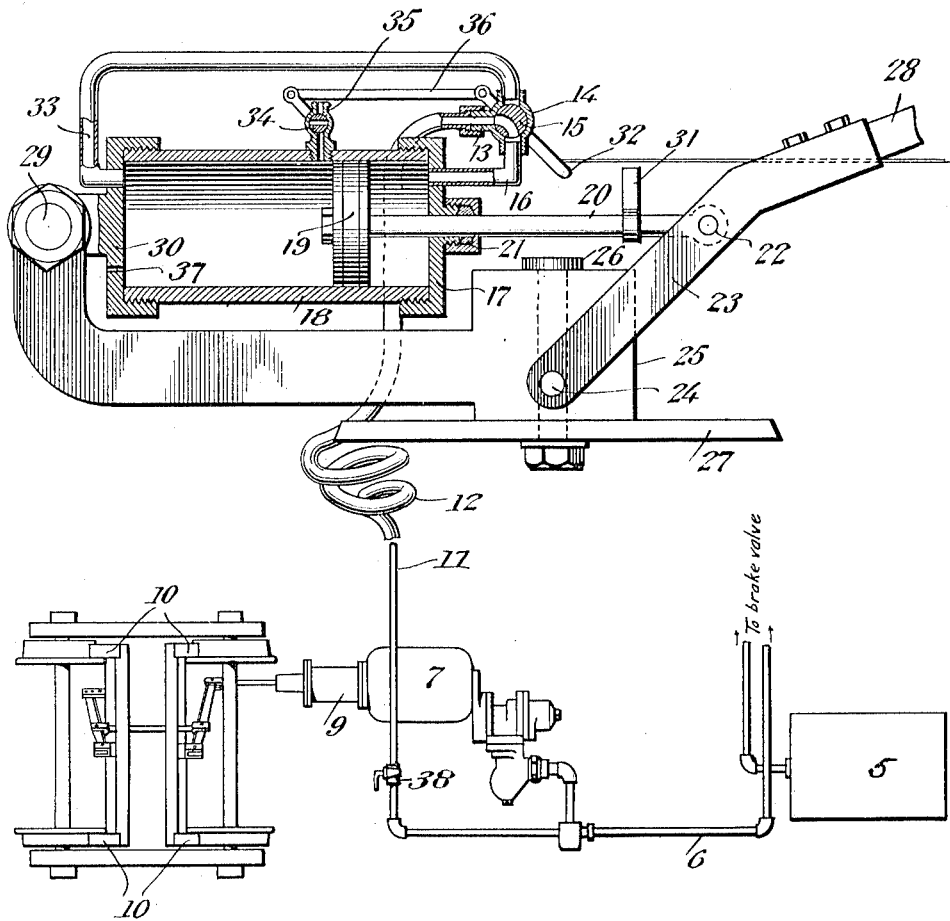
Inventor
J. E. Peck
Witnesses
By Victor J. Evans
Attorney

UNITED STATES PATENT OFFICE.

JOHN E. PECK, OF LOGAN, WEST VIRGINIA.

TROLLEY-POLE AND BRAKE CONTROL.

1,072,252.

Specification of Letters Patent. Patented Sept. 2, 1913.

Application filed January 12, 1912. Serial No. 670,876.

*To all whom it may concern:*

Be it known that I, JOHN E. PECK, a citizen of the United States, residing at Logan, in the county of Logan and State of West Virginia, have invented new and useful Improvements in Trolley-Pole and Brake Control, of which the following is a specification.

The general object of the invention is to provide means adapted for holding a trolley wheel in contact with an overhead trolley wire, and for applying the brakes and lowering the trolley pole when the trolley wheel disengages from the overhead wire; and to this end the invention consists in certain improved constructions, arrangements, and combinations of devices, which will be fully described hereinafter, and then pointed out in the claim.

Other objects will appear and be better understood from that embodiment of my invention of which the following is a specification, reference being had to the accompanying drawings forming a part hereof, in which the figure is a diagrammatic view of the invention showing parts thereof in section.

In the drawing a sufficient portion of a fluid pressure brake system is shown to enable those skilled in the art to understand one application and the operation of my invention. In this system there is included a pump or other suitable device (not shown) adapted for compressing air into the main reservoir 5 which is connected by a train pipe 6, to an auxiliary reservoir 7 which latter is suitably connected such as by piping and a triple valve, to the brake cylinder 9, in which is contained the piston (not shown) which is suitably connected so as to operate the brakes 10. As is usual in a system of this kind, a reduction of pressure is created in the train pipe 6 by an operator's or engineer's valve (not shown) which is suitably connected to the train pipe. When this reduction of pressure is effected in the train pipe the triple valve is operated by the pressure in the auxiliary reservoir so as to admit of the passage of fluid into the brake cylinder 9. When, however, the pressure in the train pipe is again increased to correspond to the pressure in the auxiliary reservoir, the triple valve opens the exhaust passage of the brake cylinder and thereby permits a release of the brakes. It will, of course, be understood that the foregoing is descriptive of the ordinary arrangement of parts in a fluid pressure brake system and it will be understood that in carrying out my invention I do not intend to limit myself to its use in combination with the specific form of fluid pressure brake system just described.

A pipe 11 which is suitably connected at one end to any suitable part of the fluid pressure brake system such as the train pipe 6, extends to the top of the car (not shown) where it connects to one end of a coil of air hose 12 whose other end is suitably connected to a nipple 13 on a valve casing 14 in which is arranged a suitable valve such as a rotary apertured plug 15, which controls communication between the nipple and a pipe or tube 16 suitably connected to a passage in the head 17 of a suitably constructed cylinder 18 which contains a piston 19, the rod 20 of which extends through a suitable packing box 21 on the head 17 and connects at its outer end to suitable means such as a pivot pin 22, which passes through the trolley pole socket 23, suitably connected such as by a pivot 24 to the bracket 25 swiveled on the pin 26 which is connected to the plate 27 on the top of the car.

When the valve is arranged as shown by full lines in the figure, the air passes through the pipes 11 and 12 through the valve and pipe 16 and into the cylinder 18. This has the effect of moving the piston 19 in a direction which will cause the rod 20 to move into the cylinder, whereupon the pole 28 will move upwardly until the sheave in the harp thereof contacts with the trolley wire. Thus, what has heretofore, in many instances, been accomplished with the use of springs, namely the holding of the sheave in contact with the wire, is now brought about by the pressure of the fluid on the piston 19. The pivot pin 29 which connects the head end portion 30 of the cylinder 18 with the bracket 25 permits the cylinder to rock and thereby compensate for any rising or lowering movement of the point of pivotal connection between the rod 20 and socket 23. When the sheave accidentally leaves the wire the fluid pressure on the piston will force the latter toward the head end 30 of the cylinder, thus moving the rod 20 farther into the cylinder, whereupon the projection 31 on the rod 20 will move into contact with an arm 32 carried by the valve 15. This contact between the elements 31 and 32 will take place before the completion of the inward movement of the rod 20 so that a continued movement of the said rod will move the valve until the same cuts off communication between the nipple 13 and tube 16 and establishes communication between the said nipple 13 and a by-pass tube 33. The fluid will now pass through the tube 33 into the head end portion 30 of the cylinder and act to move the piston 19 and the rod 20 outwardly. This will have the effect of lowering the pole 28.

Synchronously with the movement of the valve 15 the exhaust valve 34, located in the exhaust pipe 35 and suitably connected such as by means of a link or connecting rod 36, with the arm 32, is operated to open. This opening of the exhaust valve will produce two effects, the first of which is the causing a reduction of pressure in that portion of the cylinder between the piston 19 and head 17, whereby to enable the pressure between the piston 19 and head end portion 30 to move the piston toward the head 17 and clear the exhaust passage 35, whereupon the second effect is produced namely, the reduction of pressure in the train pipe and the application of the brakes. Thus, it will be seen that the application of the brakes and the lowering of the trolley pole will be simultaneously effected, or substantially so, and when the valve is moved into its original position which may be done by suitable means such as a rope or other flexible element connected to the arm 32 and extending to within easy reach of the operator, the fluid upon entering the cylinder through the pipe 16 will move the pole upwardly and thus enable the operator who holds the usual guide rope, to guide the sheave to the wire. During this operation the entrapped air between the head end portion 30 and the piston 19 will escape through a choked passage 37 in the head end portion 30 of the cylinder. When the car is in the barn and not in use, the air is cut off from the pipe 11 by a suitable valve 38 after which the valve 15 is operated so as to permit the air to exhaust from the cylinder 18 and effect the lowering of the pole 28.

Although I have shown and described one embodiment of my invention it is to be understood that I am not to be limited to the specific arrangement and construction of parts since various changes may be made, within the scope of the appended claim without departing from the spirit or sacrificing any of the advantages of the invention.

What I claim as new is:

The combination with a fluid pressure operated brake system and a vertically swinging trolley pole, of a trolley pole controller comprising an air cylinder arranged at one side of the pole, a piston reciprocatingly mounted within the cylinder, a piston rod fixed to the piston and pivotally connected to the pole, elbow pipes mounted in opposite ends of the cylinder for communication therewith and to admit fluid at opposite sides of the piston, a three-way valve casing having two of its ways connected with the elbow pipes and its remaining way connected with the fluid pressure operated brake system, a turning valve arranged within the valve casing and adapted to alternately establish communication between either of the said elbow pipes and the fluid pressure operated brake system, an exhaust nipple mounted upon the cylinder intermediate the ends, a cut-off valve rotatably mounted within the said nipple and having a crank, a trip lever fixed to the first-named valve, a link connection between the crank and the said trip lever, and an arm fixed to the piston rod and engageable with the trip lever for operating the same on the raising or lowering of the trolley pole.

In testimony whereof I affix my signature in presence of two witnesses.

JOHN E. PECK.

Witnesses:
L. G. BURNS,
S. E. McDONALD.

---

Copies of this patent may be obtained for five cents each, by addressing the "Commissioner of Patents, Washington, D. C."